(12) United States Patent
Joos et al.

(10) Patent No.: US 10,930,950 B2
(45) Date of Patent: Feb. 23, 2021

US010930950B2

(54) CLOSED ANODE FUEL CELL STARTUP METHOD

(71) Applicant: HYDROGENICS CORPORATION, Mississauga (CA)

(72) Inventors: Nathaniel Ian Joos, Toronto (CA); Paolo Forte, Maple (CA); Jin Kim, Thornhill (CA)

(*) Notice: Subject to any disclaimer, the term of this patent is extended or adjusted under 35 U.S.C. 154(b) by 257 days.

(21) Appl. No.: 15/848,906

(22) Filed: Dec. 20, 2017

(65) Prior Publication Data

US 2018/0175415 A1    Jun. 21, 2018

Related U.S. Application Data

(60) Provisional application No. 62/437,421, filed on Dec. 21, 2016.

(51) Int. Cl.
| | | |
|---|---|---|
| *H01M 8/00* | (2016.01) | |
| *H01M 8/04225* | (2016.01) | |
| *H01M 8/04119* | (2016.01) | |
| *H01M 8/04089* | (2016.01) | |
| *H01M 8/04302* | (2016.01) | |
| *H01M 8/04537* | (2016.01) | |
| *H01M 8/04746* | (2016.01) | |
| *H01M 8/04858* | (2016.01) | |

(52) U.S. Cl.
CPC ... *H01M 8/04225* (2016.02); *H01M 8/04104* (2013.01); *H01M 8/04179* (2013.01); *H01M 8/04302* (2016.02); *H01M 8/04552* (2013.01); *H01M 8/04753* (2013.01); *H01M 8/04873* (2013.01)

(58) Field of Classification Search
CPC ......... H01M 8/04225; H01M 8/04302; H01M 8/04179; H01M 8/04104
See application file for complete search history.

(56) References Cited

U.S. PATENT DOCUMENTS

| | | | |
|---|---|---|---|
| 2002/0064695 A1 | 5/2002 | Raiser | |
| 2005/0186454 A1 | 8/2005 | Clingerman et al. | |
| 2006/0003197 A1 | 1/2006 | Nielson | |
| 2006/0083965 A1 | 4/2006 | Rainville | |
| 2010/0266915 A1 | 10/2010 | Orihashi et al. | |
| 2010/0320960 A1* | 12/2010 | Hasegawa | H01M 8/04037 320/101 |
| 2015/0111070 A1 | 4/2015 | Min | |
| 2016/0380284 A1* | 12/2016 | Okuyoshi | H01M 8/04225 429/429 |

FOREIGN PATENT DOCUMENTS

| | | |
|---|---|---|
| CA | 2869203 A1 | 10/2013 |
| CA | 2930361 A1 | 5/2015 |
| EP | 1473789 | 11/2004 |
| EP | 2012/089307 | 5/2012 |
| WO | 2004114448 A2 | 12/2004 |
| WO | 2007090284 A1 | 8/2007 |

OTHER PUBLICATIONS

European Patent Application No. 17884189.6, Partial European Search Report dated Jul. 14, 2020.
International Patent Application No. PCT/CA2017/051553, International Search Report and Written Opinion dated Feb. 23, 2018.
International Patent Application No. PCT/CA2017/051553, International Preliminary Report on Patentability dated Jun. 25, 2019.

* cited by examiner

*Primary Examiner* — Cynthia H Kelly
*Assistant Examiner* — Monique M Wills
(74) *Attorney, Agent, or Firm* — Barnes & Thornburg LLP

(57) ABSTRACT

A process for starting a PEM fuel cell module includes blowing air through the cathode side of the module using external power. An amount hydrogen is released into the anode side of the module under a pressure greater than the pressure of the air on the cathode side, while the anode is otherwise closed. Cell voltages in the module are monitored for the appearance of a charged state sufficient to start the module. When the charged state is observed, the module is converted to a running state.

13 Claims, 1 Drawing Sheet

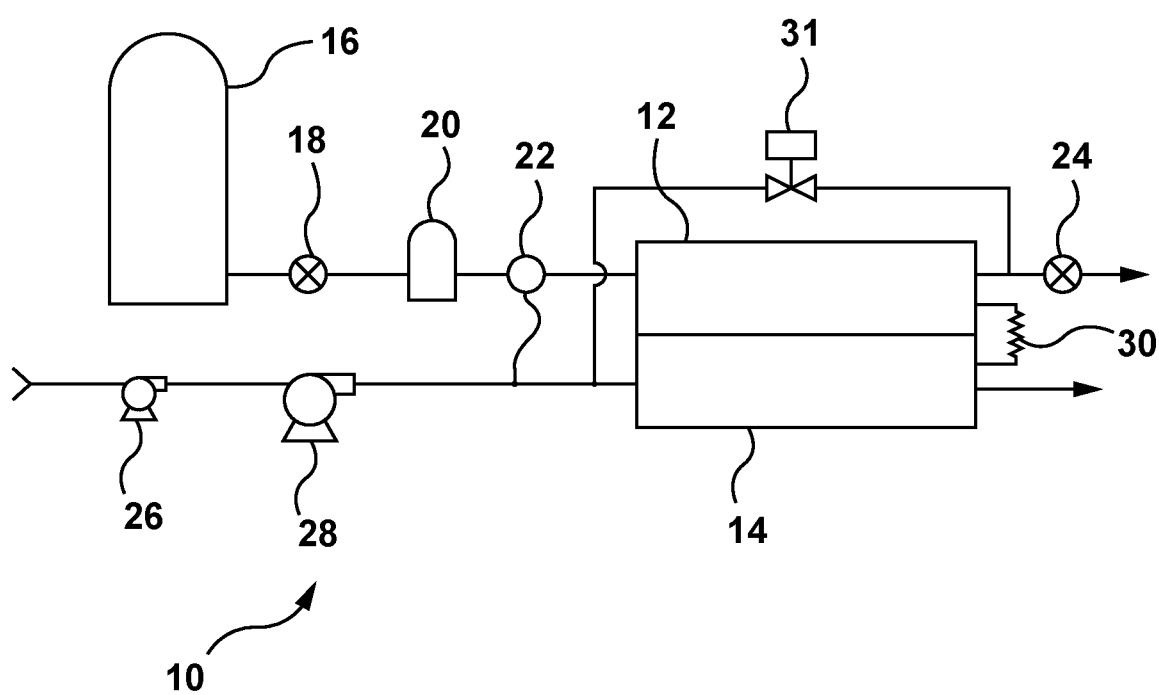

CLOSED ANODE FUEL CELL STARTUP METHOD

CROSS-REFERENCE TO RELATED APPLICATIONS

This application is a non-provisional application of U.S. Application Ser. No. 62/437,421, filed Dec. 21, 2016, which is incorporated by reference.

FIELD

This specification relates to fuel cell power modules for example PEM fuel cell modules.

BACKGROUND

In one exemplary process for shutting down a PEM fuel cell module, the cathode side of the module is vented while the anode side is closed but receives hydrogen from a small shut down reservoir (i.e. less than 5 L) at a small pressure (i.e. less than 5 psi above atmospheric pressure) until the reservoir is empty. The anode and cathode sides are connected electrically through a resistor. Oxygen on the cathode side is consumed thereby blanketing the cathode side with nitrogen. Hydrogen on the anode side is also consumed creating a vacuum that draws nitrogen over to the anode side. The fuel cell module is thereby blanketed with nitrogen. The capacitive charge of the cells is also discharged through the resistor. If the module is left for a long time, some or all of the nitrogen may be replaced with air. Examples are described in WO2004114448 and WO 2007090284, both entitled Passive Electrode Blanketing in a Fuel Cell.

To re-start the module, a small fan powered by a battery or other energy source is operated to displace nitrogen on the cathode side with air. Hydrogen is introduced into the anode side of the module from a larger fuel reservoir and dispersed throughout the anode side of the module with a recirculation pump or by opening a purge valve. Once the cells of the module regain sufficient charge, the module can sustain electrochemical reactions sufficient to run its balance of plant and the module is considered to have restarted.

INTRODUCTION

After a shut down procedure, for example as described above, the anode and cathode sides of a fuel cell may be blanketed in nitrogen or mixture of gasses (i.e. air) that is primarily nitrogen. The mixture may have, and typically does have, more nitrogen than ambient air, possibly near 100% nitrogen. Further, the gas diffusion layers on either side of the membranes in a PEM fuel cell may inhibit the replacement of nitrogen with oxygen and hydrogen during the start up procedure.

The MEAs in a fuel cell stack are inherently capacitive. Re-starting a fuel cell module requires all cells to reach at least a partially charged state before the stack is used to supply a material current. To achieve this charged state, hydrogen and oxygen must be dispersed throughout the anode and cathode sides of the stack. Hydrogen can be dispersed with a hydrogen recirculation pump in a loop around the anode side, but that is a complication that consumes stored power or if powered from the stack can delay or prevent startup depending on the hydrogen and air concentration throughout the fuel cell stack and the individual cell voltages within the fuel cell stack. Alternatively, hydrogen can be dispersed by flowing hydrogen through the anode side of the module to a vent or purge valve on the outlet of the anode side. This releases hydrogen to the atmosphere, which is not a pollutant but can in some cases create a combustible mixture outside of the vent. The presence of a combustible mixture can be prevented by venting hydrogen into the cathode side exhaust and blowing sufficient air through the cathode side. However, the airflow rate required for dilution exceeds the airflow rate required to charge the stack, so this method consumes more stored power.

In some cases, the procedure described above may also fail to start a module that is very old or damaged (i.e. by environmental contamination) and so has membranes that are more permeable than normal.

It is desirable in at least some circumstances to minimize the amount of stored power (i.e. in an external battery) needed to start a fuel cell module. It is also desirable in at least some circumstances to avoid venting hydrogen, at least before a large flow of air is available to dilute the hydrogen. It is also desirable in at least some circumstances to be able to restart old or damaged fuel cell modules.

This specification describes a process for starting a fuel cell module. Optionally, the process can be implemented without purging hydrogen or recirculating hydrogen through the anode side of a module. The process can also be used to start a module with old or degraded membranes that are more permeable than new membranes. In the process, hydrogen is distributed through the anode side of the module. The pressure on the anode side of the module is adjusted such that the cells of the module reach at least a minimum voltage. The module is then converted to a running state.

In some examples, the process includes blowing air through the cathode side of the module using a small amount of external power, for example less than 1000 W or less than 100 W. Hydrogen is released into the anode side of the module, preferably under a pressure greater than the pressure of the air on the cathode side, and preferably in an amount and pressure effective to distribute hydrogen to substantially all of the cells. The distribution of hydrogen is aided by the permeation of gases from the anode side to the cathode side driven by the differential pressure. The pressure differential across the membrane is then reduced, optionally by releasing only a finite amount of pressurized hydrogen while the anode side is otherwise closed in the previous step such that the permeation of gasses to the cathode side inherently reduces pressure on the anode side over time. Cell voltages in the module are monitored for the appearance of a charged state sufficient to start the module, i.e. to power the balance of plant from the fuel cell stack rather than external power. When the charged state is observed, the module is converted to a running state. In the running state, a generally continuous supply of hydrogen is provided to the anode side and the stack is used to power a higher air flow through the cathode side.

BRIEF DESCRIPTION OF THE FIGURES

FIG. 1 is a schematic drawing of parts of a fuel cell module.

DETAILED DESCRIPTION

Although the anode side and cathode side of a PEM fuel cell module are separated by membranes, there is always some flow of gas through the membrane in a PEM fuel cell. The membrane is typically less than 20 microns thick and will permeate nitrogen, hydrogen or air under the influence of a pressure or concentration differential across the membranes. In normal operation the presence of hydrogen on the cathode side of the module is typically considered preferable to having air on the anode side. Hydrogen permeation across the membrane may cause combustion on the cathode side, but the resulting water can be removed, or non-combusted hydrogen diluted, by blowing air through the cathode side while the module is running. Air permeation to the anode side of the stack can lead to nitrogen accumulation on the anode, which would require additional purging to prevent a concentration buildup that impacted fuel cell performance. Accordingly, some modules supply hydrogen through a forward pressure regulator biased to provide hydrogen at a small pressure, i.e. less than 5 psi or less than 1 psi above the pressure in the cathode side. As a module ages or is exposed to environmental contamination, the permeability of the membranes increases.

The cells in a fuel cell stack (in particular the MEA) inherently operate to some extent like capacitors. The capacitive charge (or simply charge) of the stack, or a cell or group of cells in the stack, can be determined according to an equivalent circuit module or approximated by measuring the voltage of the cell, group of cells or stack. When a module is off, the cells are typically discharged so as to present less of a safety concern (i.e. that someone working on the cell stack could receive a shock). When the module is restarted, all cells in the stack must develop a minimal charge (or voltage) before the stack can be allowed to deliver significant power (or current). Otherwise, there is a potential for the voltage in a weakly charged cell to become negative. This reversal of polarity could damage the cell. Therefore cell voltage is monitored and the stack is not allowed to provide material power, or optionally any power, until all cells in the stack have at least a minimum charge (i.e. voltage), for example 25% or 50% of normal or maximum cell voltage, or for further example 0.1 V or 0.2 V per cell for cells that normally (or nominally) operate at 0.5 V to 0.6 V. Cell voltage can be monitored by monitoring the voltage of the stack, groups of cells or individual cells. However, if only the voltage of the stack is measured a factor of safety is preferably applied (i.e. a larger minimum voltage per cell is required) to account for the risk that some cells have less than the average voltage per cell. The factor of safety can be reduced if the voltage of groups of cells, i.e. 10 cells or less or 5 cells or less, is monitored. Preferably, the voltage of groups of cells or individual cells is monitored.

With very permeable membranes, supplying hydrogen even continuously at an ordinary pressure differential while blowing air at a low rate through the cathode might never create the required minimum charge in each cell. The combustion of hydrogen on the cathode side consumes oxygen, leaving insufficient oxygen for the electrochemical reaction required to charge the cells. While it may be possible to start the module by providing more air, powering a large air fan (for example the normal operating blower) using external power is undesirable in at least some circumstances. The method described below can be used to start modules with very permeable membranes without significant external power (i.e. other than a small battery typically provided to power control electronics). The method can also be used to start modules with normally permeable membranes. In these cases, conventional startup procedures involve venting hydrogen or recirculating hydrogen with a pump using significant external power whereas the method described above does not require either. Some hydrogen is released to the cathode side, but the release rate can be such that the hydrogen is combusted in a controlled manner in the cathode side of the module such that only a small amount of hydrogen, or no hydrogen, is released to the atmosphere outside of the fuel cell module.

FIG. 1 shows a fuel cell power module 10. The module 10 has a fuel cell stack typically containing many cells, represented schematically in FIG. 1 by anode side 12 and cathode side 14. A hydrogen tank 16 provides hydrogen to anode side 12 though inlet valve 18, shutdown reservoir 20 and forward pressure regulator 22. An outlet from the anode side 12 can be closed with a purge valve 24. The cathode side 14 receives air from either small blower 26, which is powered by an external battery or power source, or large blower 28, which is powered by the stack or another external power source. Forward pressure regulator 22 may be a dome loaded pressure regulator with its dome connected to an inlet to the cathode side.

A resistor 30 is attached between the anode side 12 and cathode side 14 for use during a nitrogen blanketing shut down procedure. Shutdown reservoir 20 is used, after closing inlet valve 18 and purge valve 24, to provide a quantity of hydrogen for the shutdown procedure. Forward pressure regulator 22 maintains the pressure of hydrogen in the anode side 12 at an increment, for example in the range of 0.1 psi to 5 psi, or 0.5 to 1 psi, above the pressure in the cathode side 14 as long as sufficient hydrogen is available. Thus, during the shutdown method, shutdown reservoir 20 may contain a volume of hydrogen at 100 psi (or whatever pressure, optionally regulated, is delivered from tank 16) and releases the hydrogen over time through forward pressure regulator 22. After the shutdown procedure, the anode side 12 and cathode side 14 are at least partially blanketed with nitrogen and the electrochemical and capacitive charge of the stack has been dissipated through resistor 30.

To restart the module, small blower 26 is operated, for example by an external battery used to power a controller and valves (typically solenoid valves) for the module 10. The external battery powering the small blower 26 may have a different nominal voltage than the stack, for example the battery may have a nominal voltage in the range of 3-24 volts whereas the stack has a nominal voltage of 48 volts or more. Purge valve 24 is closed and a hydrogen recirculation loop, if any, is not powered. Inlet valve 18 is opened temporarily to admit a finite amount of hydrogen into shutdown reservoir 20 and then closed. Hydrogen is released from the shutdown reservoir 20 to the anode side 12, optionally through the forward pressure regulator 22 which maintains a pressure differential across the membranes for as long as sufficient hydrogen is available in shutdown reservoir 20. The hydrogen diffuses through the anode side 12 and gasses (i.e. hydrogen and nitrogen) permeate to the cathode side 14. Permeation to the cathode side 14 eventually causes the pressure differential across the membranes to decrease as the shutdown reservoir is depressurized. As a result, the rate of hydrogen permeation across the membranes also declines but after the pressure differential has usefully caused hydrogen to be dispersed through the anode side. Cell voltages are monitored during the procedure. When all cells (which can optionally be determined by monitoring groups of cells or the stack) show a sufficient charge or voltage (which has been observed to generally coincide with a decrease in the pressure differential across the membranes), the module 10 is converted to a running state. Conversion to the running state includes re-opening solenoid valve 18 and powering large blower 28 from the stack or other external power source.

As a result of the method describes above, hydrogen is provided on the anode side of the module initially under a first pressure. The first pressure may be greater than the pressure of the air on the cathode side by an amount determined by the forward pressure regulator. Later, after some of the hydrogen is consumed or hydrogen is otherwise dispersed through the anode side of the module, hydrogen is provided on the anode side of the module under a second pressure, which may be a variable pressure. The second pressure is lower than the first pressure. Preferably the second pressure is still greater than the pressure on the cathode side of the module, or at least equal to the pressure on the cathode side of the module, at all times. Optionally, the second pressure might briefly (i.e. for less than 1 second) be less than the pressure on the cathode side of the module. However, negative pressure on the anode side of the module is preferably not sufficient, in time and duration, to draw a material amount of air to the anode side.

In an alternative method, inlet valve 18 is not closed but forward pressure regulator 22 is adjusted to decrease the pressure differential across the membranes to provide the second pressure. For example, the forward pressure regulator 22 can be continuously adjusted while monitoring cell voltage until the cells show sufficient charge or voltage to convert the module to the running state. In another example, a second pressure is predetermined, for example by observing a pressure differential that coincides with an increase in cell voltage using any of the variable anode side pressure methods described herein, and the forward pressure regulator 22 is adjusted to provide the predetermined second pressure. For example, the second pressure might be 0.5 psi or less or 0.25 psi or less. In some cases, a predetermined second pressure might also be effective to also disperse hydrogen through the anode side of the module 10 such that a distinct first pressure is not required. However, while this might be sufficient to start the module 10, it is likely to increase the time required to start the module 10 relative to a method with a higher first pressure.

The conversion to a running state is preferably done quickly, before the voltage or charge in the cells is dissipated through the resistor 30. Alternatively, the resistor 30 can be disconnected during the startup procedure to avoid or reduce the need to convert the module 10 to a running state quickly upon observing sufficient cell voltage, or upon observing a decrease in the pressure differential. Although the MEAs in the stack are inherently capacitive, and can hold and release an electric charge, they do not have sufficient storage capacity to discharge through resistor 30 for more than a few seconds and then operate large blower 28 for enough time to develop an electrochemical reaction sufficient for sustained operation.

The inventors have observed that the cells do not develop a charge while hydrogen is delivered to the anode side 12 and a pressure differential is maintained across the membranes by the forward pressure regulator 22, at least when a permeable module 10 (i.e. a module 10 wherein the membranes in the fuel cell stack have developed a gas crossover leak from age, usage or environment contamination) is restarted using a small blower 26. In the example illustrated, small blower 26 is an air flow meter normally used when the module 10 is running to monitor the operation of large blower 28 but powered for use in the start up method. This small blower 26 uses less than 50 watts, typically less than 20 watts, and is operated from a small battery sized (in both voltage and watt-hours) primarily to operate solenoid valves and a controller. While the hydrogen pressure and permeation usefully distribute hydrogen through the anode side 12, without intending to be limited by theory, it is possible that hydrogen permeating across the membranes consumes enough of the available oxygen on the cathode side 14 in combustion thus leaving insufficient oxygen to generate an electrochemical reaction to charge the cells. However, as the shutdown reservoir 20 empties with inlet valve 18 closed, the hydrogen pressure in the anode side 12 decreases despite the action of the forward pressure regulator 22. Hydrogen permeation decreases while the small blower 26 continues to supply fresh air to the cathode side 14. Eventually, conditions suitable for the electrochemical reaction appear and the cells develop a charge.

While the process is described above a being useful to start old or damaged modules, it can also be applied to new modules, perhaps with adjustments to the initial amount and pressure of hydrogen supplied. In the case of a new module, the method avoids venting or recirculating hydrogen. Venting might not be permitted at all in some circumstances, or permitted only to the cathode side outlet in the presence of a large airflow. Recirculating hydrogen by pump or providing a diluting flow of air both require large amounts of power, which would require the module 10 to be started by an external power supply or carry a significantly larger battery.

In the example above, the cathode side 14 is essentially at atmospheric pressure. However, it is expected that the method would still work with a pressurized cathode side 14 provided that hydrogen was temporarily provided at an even higher pressure to the anode side. It is possible in some examples that the shutdown reservoir 20 is not required. The function of the shutdown reservoir 20 might be provided by a pipe between the inlet valve 18 and the anode side 12, or by a manifold within the anode side 12 of a stack, or both. Alternatively or additionally, the inlet valve 18 could be opened briefly multiple times to admit pulses of hydrogen collectively providing an effective amount of pressurized hydrogen into the anode side. In another option, rather than reducing the anode side pressure after hydrogen is supplied to the anode side 12, the pressure of the cathode side 14 might be increased to provide a similar reduction in the pressure differential. The overall effect desired is to allow hydrogen (and possibly nitrogen) to permeate through the membrane for a period of time and then to decrease or stop the hydrogen (and possibly nitrogen) permeation preferably while providing at least a small flow of air to at first combust permeated hydrogen and then to provide an electrochemical reaction to charge the cells.

In the method described above, hydrogen is dispersed through the anode side 12 by adding a quantum (i.e. mass or molar amount) of hydrogen under pressure relative to the cathode pressure, and preferably also relative to the pre-existing anode pressure, into an otherwise closed anode. It is believed that allowing some hydrogen permeation through the membranes helps distribute hydrogen through the anode side 12. The quantum of hydrogen added is preferably sufficient to create a hydrogen concentration sufficient to charge the cells. 3% hydrogen may be sufficient. Although the method as described above does not involve opening purge valve 24, opening purge valve 24 with inlet valve 18 closed after delivering only a small amount of hydrogen to anode side 12 could be used to depressurize the anode side 12 after hydrogen is dispersed. The amount of hydrogen that would be released through the purge valve 24 would be much less than under a conventional startup purge with inlet valve 18 open and might usefully reduce the time required for the start up procedure when used with a module 10 having new or otherwise minimally permeable membranes.

Closing the inlet valve 18 temporarily, although counterintuitive when trying to start a module 10, or otherwise providing only a fixed quantum of hydrogen to the anode side 12, allows hydrogen permeation to the cathode side 14 to eventually cease or become small enough to allow for the electrochemical reaction to occur and charge the cells. Cell voltage will rise as the electrochemical reaction occurs and charges the cell. However, particularly if there is a shut down resistor 30 attached, the charge will soon disappear. Therefore it may be useful to provide an automated controller that monitors the cell charges and automatically runs the module 10 (i.e. re-opens inlet valve 18 and turns on large blower 28 as soon as the least charged cell (or group of cells) reaches a predetermined minimum charged state).

When the startup method is used with a module 10 having minimally permeable membranes, permeating the amount of hydrogen contained in a typical shutdown reservoir 20 could take several minutes or more. In that case, inlet valve 18 could be opened only very briefly such that shutdown reservoir 20 is not completely pressurized and filled from hydrogen tank 16. Alternatively or additionally, the pressure differential provided by the forward pressure regulator 20 could be increased during the start up procedure. In another alternative, a bypass line might be provided around the shutdown reservoir 20 such that opening inlet valve 18 temporarily only provides as much hydrogen to be added downstream of inlet valve 18 as forward pressure regulator 20 will allow. In this case, the bypass line would act to some extent as a smaller shutdown reservoir 20 and could be sized (or provided with a small reservoir) accordingly. Alternatively, an optional purge valve 31 can be used to more rapidly reduce the hydrogen pressure on the anode side of the fuel cell and/or ensure adequate hydrogen distribution throughout the fuel cell stack by introducing gas from the anode to the cathode side of the fuel cell whereby it is consumed by combustion (which may be catalytically facilitated) internally within the fuel cell stack.

In alternative methods, a different method (other than applying the first pressure) might be used to disperse the hydrogen. For example, a small amount of hydrogen can be vented through the module or a hydrogen recirculation loop can be powered briefly by a battery. After dispersing the hydrogen, hydrogen is applied at a second pressure, i.e. a pressure lower than the ordinary operating pressure, optionally at a pressure differential of 0.5 psi or less or 0.25 psi or less, optionally at a variable pressure. The module is then converted to a running state. However, while these methods might usefully start a leaky module, they are not as efficient as applying the first pressure to disperse the hydrogen.

We claim:

1. A method of starting a fuel cell module comprising the steps of:
    blowing air through the cathode side of the module using power other than from the stack;
    providing hydrogen on the anode side of the module under a first pressure greater than the pressure of the air on the cathode side and later at a second pressure that is lower than the first pressure;
    monitoring the voltages of the cells in the module for the appearance of a sufficiently charged state; and,
    after the preceding steps and the appearance of a sufficiently charged state, converting the module to a running state.

2. The method of claim 1 wherein air is blown through the cathode at a rate that is 20% or less of the lowest rate used in normal running conditions, or by a fan smaller than the fan used under normal running conditions.

3. The method of claim 1 wherein a finite amount of hydrogen is released into communication with the anode side of the module.

4. The method of claim 3 wherein the hydrogen is released through a forward pressure regulator.

5. The method of claim 3 wherein the anode side of the module is closed.

6. The method of claim 1 wherein the sufficiently charged state is indicated by the least charged cell be sufficiently charged to not have a negative voltage when the module is run.

7. The method of claim 1 wherein the sufficiently charged state is indicated by the least charged cell being above a threshold charge.

8. The method of claim 1 wherein the running state is characterized by the fuel cells of the module powering at least the balance of plant.

9. The method of claim 8 wherein the running state is characterized by the module being provided with a continuous supply of hydrogen.

10. The method of claim 1 wherein the second pressure is a variable pressure.

11. The method of claim 5, wherein the anode side of the module is closed without being vented and/or without recirculating hydrogen.

12. The method of claim 7, wherein the threshold charge is 25-50% of a fully charged state.

13. The method of claim 8, wherein the fuel cells of the module power at least the balance of plant using an air blower in communication with the cathode side.

* * * * *